United States Patent [19]

Hill et al.

[11] Patent Number: 5,062,568
[45] Date of Patent: Nov. 5, 1991

[54] THERMOPLASTIC CUP AND METHOD AND APPARATUS FOR MAKING

[75] Inventors: James A. Hill, Toledo; John E. Burtch, Curtice, both of Ohio

[73] Assignee: Owens-Illinois Plastic Products Inc., Toledo, Ohio

[21] Appl. No.: 594,533

[22] Filed: Oct. 9, 1990

[51] Int. Cl.$^5$ .................................................. B65D 3/12
[52] U.S. Cl. ................................... 229/1.5 B; 229/4.5; 229/5.8
[58] Field of Search ...................... 229/1.5 B, 5.8, 5.5, 229/DIG. 14, 4.5

[56] References Cited

U.S. PATENT DOCUMENTS

| | | | |
|---|---|---|---|
| 1,904,331 | 5/1931 | Sidebotham | 229/5.5 |
| 3,628,689 | 12/1971 | Rogers | 229/5.5 |
| 4,261,505 | 4/1981 | Matsui | 229/DIG. 14 |
| 4,412,644 | 11/1983 | La Fever | 229/4.5 |
| 4,715,527 | 12/1987 | Tsuzuki et al. | 229/1.5 B |

*Primary Examiner*—Stephen Marcus
*Assistant Examiner*—Christopher McDonald

[57] ABSTRACT

A two-piece nestable cup-like container comprising a continuous side wall having an open upper end and includes a recessed bottom. The side wall is formed from a single double ended sheet of a heat-shrinkable thermoplastic material. The ends of the sheet are joined to one another along a liquid-tight seam. The side wall extends downwardly from a point near the open mouth of the upper end of the container to a point near the bottom and is thereafter folded at its lower edge upwardly to form a double wall portion and a radially inwardly extending annular portion that underlies a separate bottom member that is sealingly joined to the radially inwardly extending portion on the bottom edge of the side wall. In accordance with the method and apparatus, a sleeve made from the sheet by joining the ends is heat shrunk on a mandrel and the free edge at the lower portion of the side wall is caused to shrink inwardly. Opposed shaping members are moved toward one another while the sheet is at an appropriate temperature for shrinking and forming to define the doubled wall edge and to the heat seal the bottom member to the radially inwardly extending portion.

7 Claims, 10 Drawing Sheets

THERMOPLASTIC CUP AND METHOD AND APPARATUS FOR MAKING

This invention relates to nestable cup-like containers and particularly such containers which are made of thermoplastic material which is heat-shrinkable.

BACKGROUND AND SUMMARY OF THE INVENTION

U.S. Pat. No. 3,854,583 (Amberg et al) discloses a container that includes a body which is fabricated from a sheet of an expanded thermoplastic material and which is provided with a rolled rim or bead at the mouth of such container. Such rolled rim or bead helps to stiffen the container at the mouth thereof, provides a smooth edge for drinking a beverage from the container, and provides a protrusion from the side wall of the container that is useful in securing a cap or closure to the container. Containers of the type illustrated in the aforesaid U.S. Pat. No. 3,854,583 have been extensively utilized as cups for single service quantities of a beverage, for example, coffee, and, when so utilized, the bodies of such containers have typically been manufactured in a nestable or frustoconical configuration from rectangular blanks of a heat-shrinkable thermoplastic material by a process which includes the shrinking of a cylindrical sleeve formed from such blank against the outer surface of a frustoconical forming mandrel. Typically, such cups have been produced by apparatus similar to that disclosed in U.S. Pat. No. 4,053,346 (Amberg et al), and may also be produced by apparatus similar to that disclosed in U.S. Pat. No. 4,072,549 (Amberg et al).

In U.S. applications Ser. No. 330,026 filed Apr. 14, 1989, and Ser. No. 504,168 filed Apr. 3, 1990, there are disclosed similar apparatus wherein the containers are formed in inverted position.

It has been known that such containers would be more stable if the bottom thereof were recessed. It has been suggested that such a recess can be formed in a method and apparatus wherein a foam sheet is first shrunk on a molding form, removed from the molding form and placed within a compression mold which is first heated and then cooled. See U.S. Pat. No. 3,967,991. Such a method, if successful, is costly and time consuming and requires costly and complex equipment.

Accordingly among the objectives of the present invention are to provide a two-piece nestable container which is formed from a double ended sheet that is first heat sealed to provide a sleeve like member and which container has a recess bottom; which container can be readily formed on known apparatus wherein the sheet is first heat sealed to form a sleeve and the sleeve is shrunk on a mandrel with minor modifications; wherein the method and apparatus does not adversely affect the normal forming method of containers without a recessed bottom; and wherein the construction of the recessed bottom provides stability to the container; wherein the container can be readily stacked; wherein the container has a sufficiently large recess to receive condiments such as coffee or tea and be nested for use in dispensing machines; and wherein the depth of the recess can relatively easily be changed.

In accordance with the invention, a two-piece nestable cup-like container comprises a side wall having an open upper end and includes a recessed bottom. This side wall is formed from a single double ended sheet of a heat-shrinkable thermoplastic material having an inner surface adapted to contact the liquid product to be contained in the container. The ends of the sheet are joined to one another along a liquid-tight seam. The side wall extends downwardly from a point near the open mouth of the upper end of the container to a point near the bottom and is thereafter folded at its lower edge upwardly to form a double wall portion and a radially upwardly extending annular portion that underlies a separate bottom member that is sealingly and joined to the radially inwardly extending portion of the bottom edge of the side wall. In accordance with the method and apparatus, a sleeve made from the sheet by joining the ends is heat shrunk on a mandrel and the free edge at the lower portion of the side wall is caused to shrink inwardly. Opposed shaping members are moved toward one another while the sheet is at an appropriate temperature for shrinking and forming to define the doubled wall edge and to heat seal the bottom member to the radially inwardly extending portion.

DESCRIPTION

Figure 1:
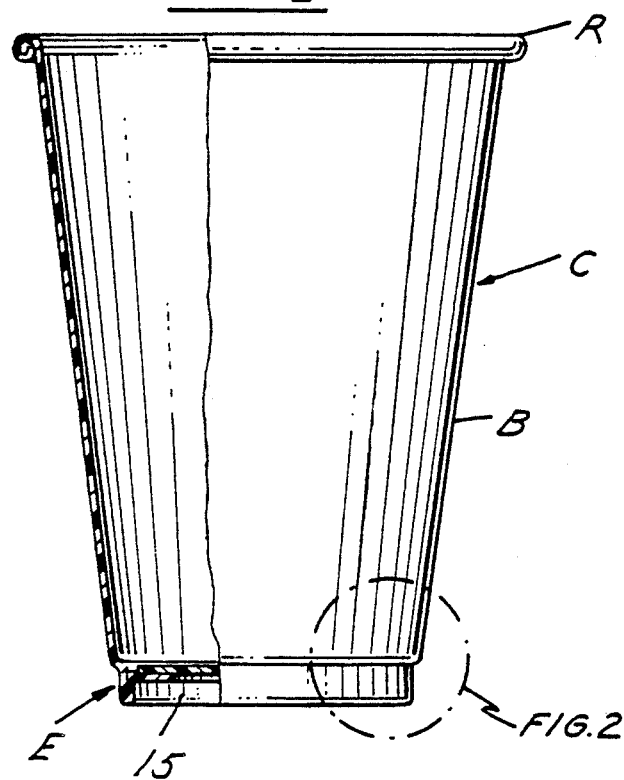
FIG. 1 is a part sectional elevational view of a container embodying the invention.
Figure 2:
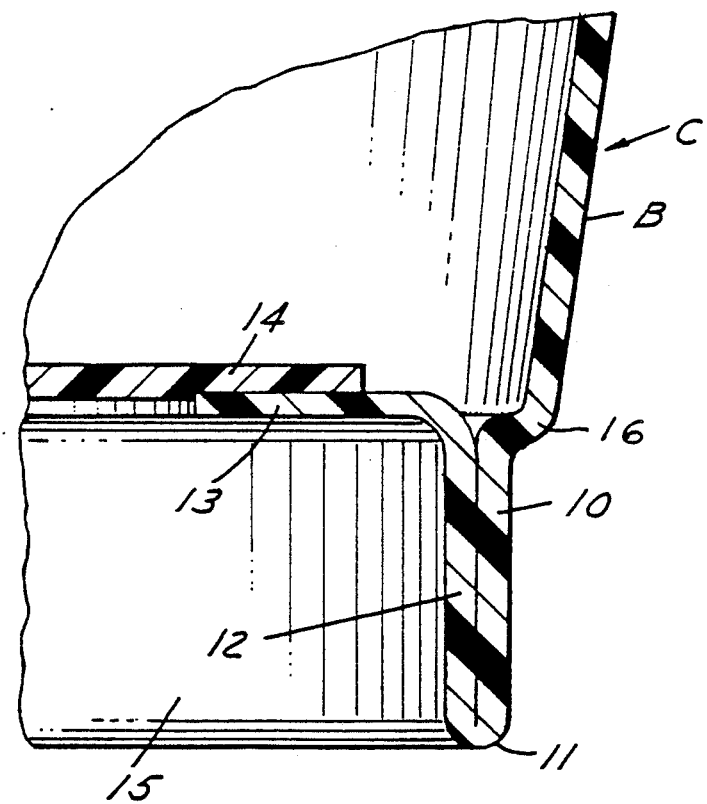
FIG. 2 is a fragmentary vertical cross sectional view of a portion of the container.
Figure 3:
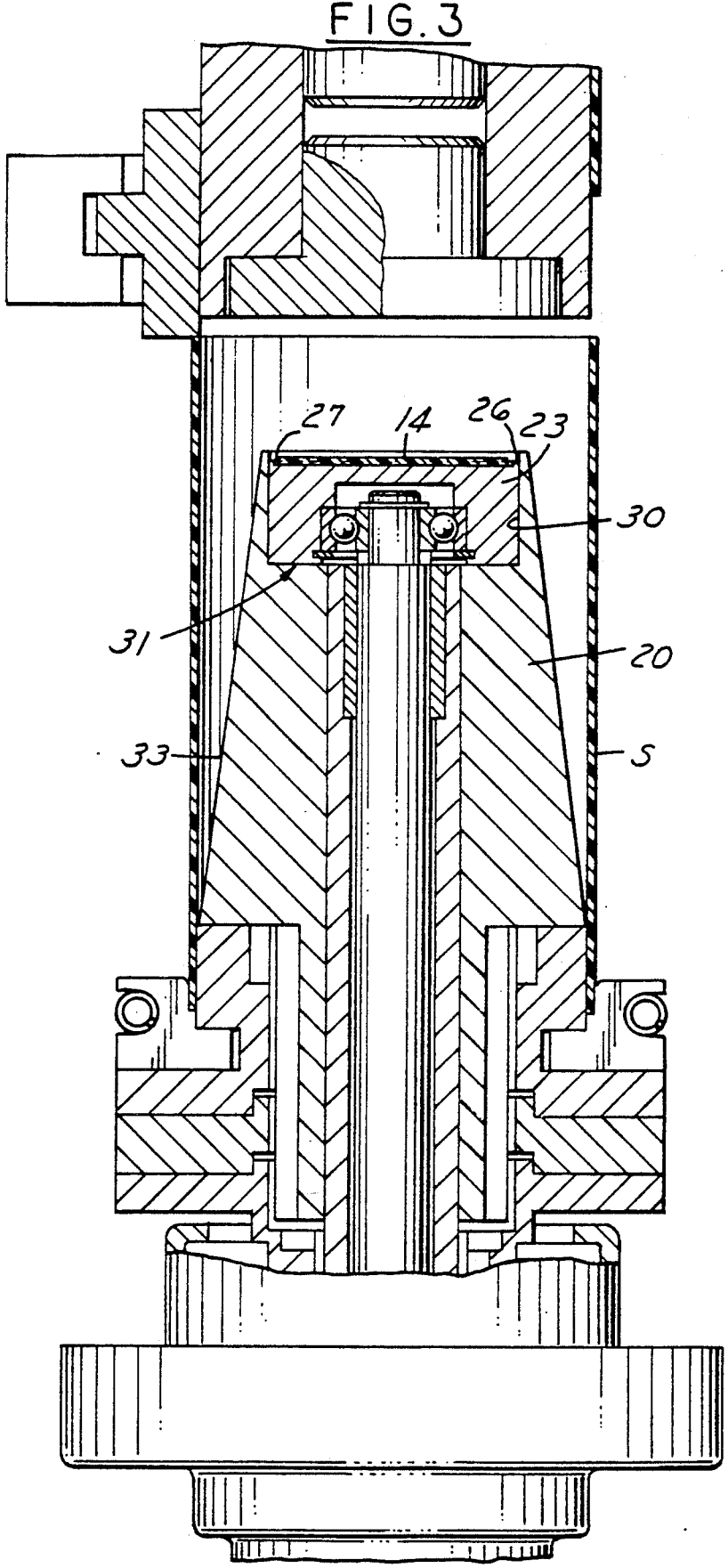
FIGS. 3–11 are fragmentary sectional views of an apparatus for forming a portion of the containers showing the parts in relatively different positions during a method of the forming.

Referring to FIGS. 1 and 2, the container C, embodying the invention, is made of foam plastic material and has a nestable or generally frustoconical configuration. The rolled rim R of the container C is located at the open, larger end thereof, and the container C also has a smaller end E, which is closed, as generally described in the aforesaid U.S. Pat. No. 3,854,583, so that the container C, when in an upright position, can hold a liquid, for example, hot coffee.

As shown in FIGS. 1 and 2, the lower edge of the body portion or side wall B of the container is formed with an axial outer wall 10 that is integrally connected to the side wall and an integral connecting portion 11 connects an inner axial wall 12 to the outer wall 10. An integral radially inwardly extending annular lip 13 extends from the upper end of the inner wall 12 and has its upper surface bonded by heat sealing to the lower surface of a bottom forming member or disk 14 made of foam plastic. The walls 10, 12 are compressed such that the total thickness of the walls 10, 12 is less than twice the thickness of the remainder of the side wall B. The surfaces of the container are smooth throughout. The side wall B preferably is connected to outer wall 10 by an integral shoulder 16 to facilitate stacking of the containers in a minimal stack height. The inner wall 12 and outer wall 10 are parallel and are compressed in abutting relation.

Thus, the container C has a recessed bottom providing stability and permitting a space to be formed that can be filled with condiments, such as coffee or tea without inhibiting the stacking of one container relative to another. Of course, it is contemplated that cylindrical or other non-nestable containers can be provided with a rolled rim at an open end thereof similar to the rolled rim R of the container C.

The container C, or at least a body portion B thereof, is preferably fabricated from a rectangular blank of a suitable heat shrinkable thermoplastic material in accordance with the teachings of the aforesaid U.S. Pat. No. 3,854,583, and apparatus generally similar to that disclosed in the aforesaid U.S. Pat. No. 4,053,346 or generally similar to that disclosed in the aforesaid U.S. Pat. No. 4,072,549, appropriately modified as presently described.

Alternatively, the apparatus according to the following description may be employed to manufacture such container C, such apparatus being like that shown in the aforementioned patent applications Ser. Nos. 338,026 and 504,168, incorporated herein by reference appropriately modified as presently described.

In the manufacture of containers for the serving of single service quantities of the beverage, viz., 6–20 oz. containers, by any of the types of apparatus referred to above, each container, typically, is fabricated from a blank of a rigid, oriented, expanded polymeric material, for example, expanded general purpose or medium impact polystyrene, with an initial thickness or approximately 18–25 mils (0.018–0.025 inch) and with a density of approximately 10–12 PCF (pounds per cubic foot). Of course, the use of other types of rigid thermoplastic materials is contemplated, but expanded polystyrene, alone or in combination with other materials, for example, coextruded with thin surface layers of unexpanded polystyrene, is preferred for reasons of economy, rigidity and insulating characteristics.

Cylindrical sleeves are formed in succession on the sleeve forming mandrels from rectangular blanks which are successively severed from a web, of indefinite length of a suitable heat-shrinkable material at a sleeve winding station. Each sleeve is formed on the sleeve forming mandrel. With mandrel advanced successively through a heating section of the cup making machine. The heating section preferably, is in the form of elongated electric infrared radiant heaters above and on opposite sides of the mandrels as they advance and because of the heat shrinkability of the material of the sleeves, the heating section gradually causes the cylindrical sleeves on the shrink mandrels to shrink into tight engaging relationship therewith, forming the bodies of unrimmed containers. Further, each mandrel is rotated about its own axis as it passes through another heating section to provide for uniform shrinkage of the sleeves on the mandrel.

Figure 4:
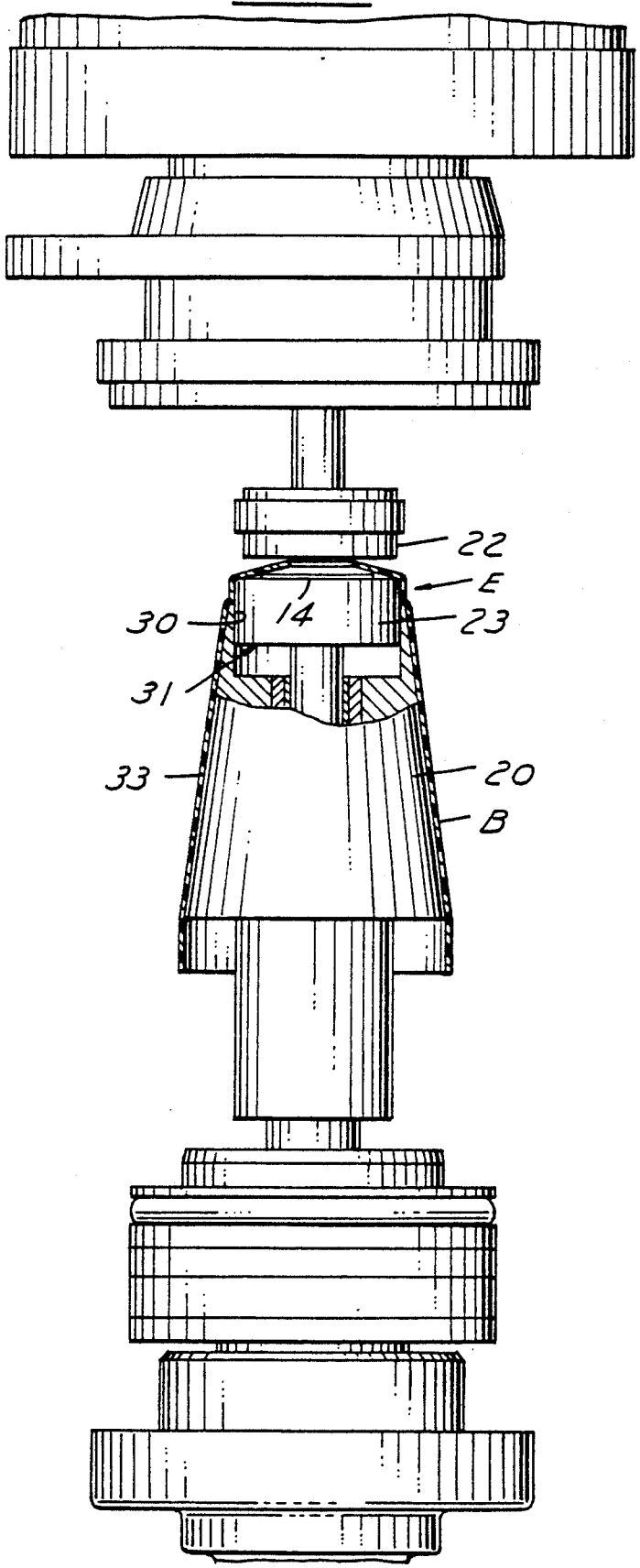
Figure 5:
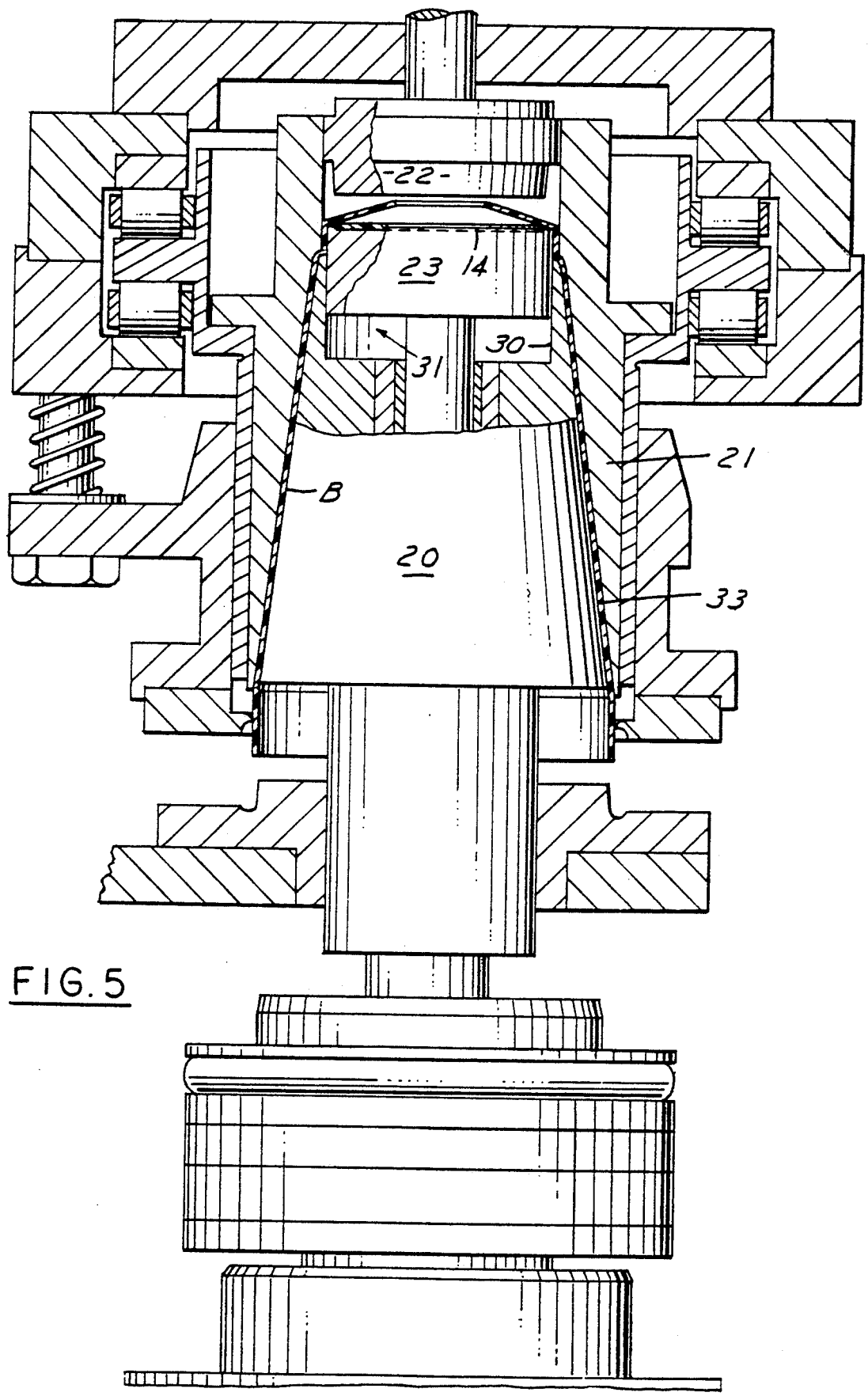
Figure 6:
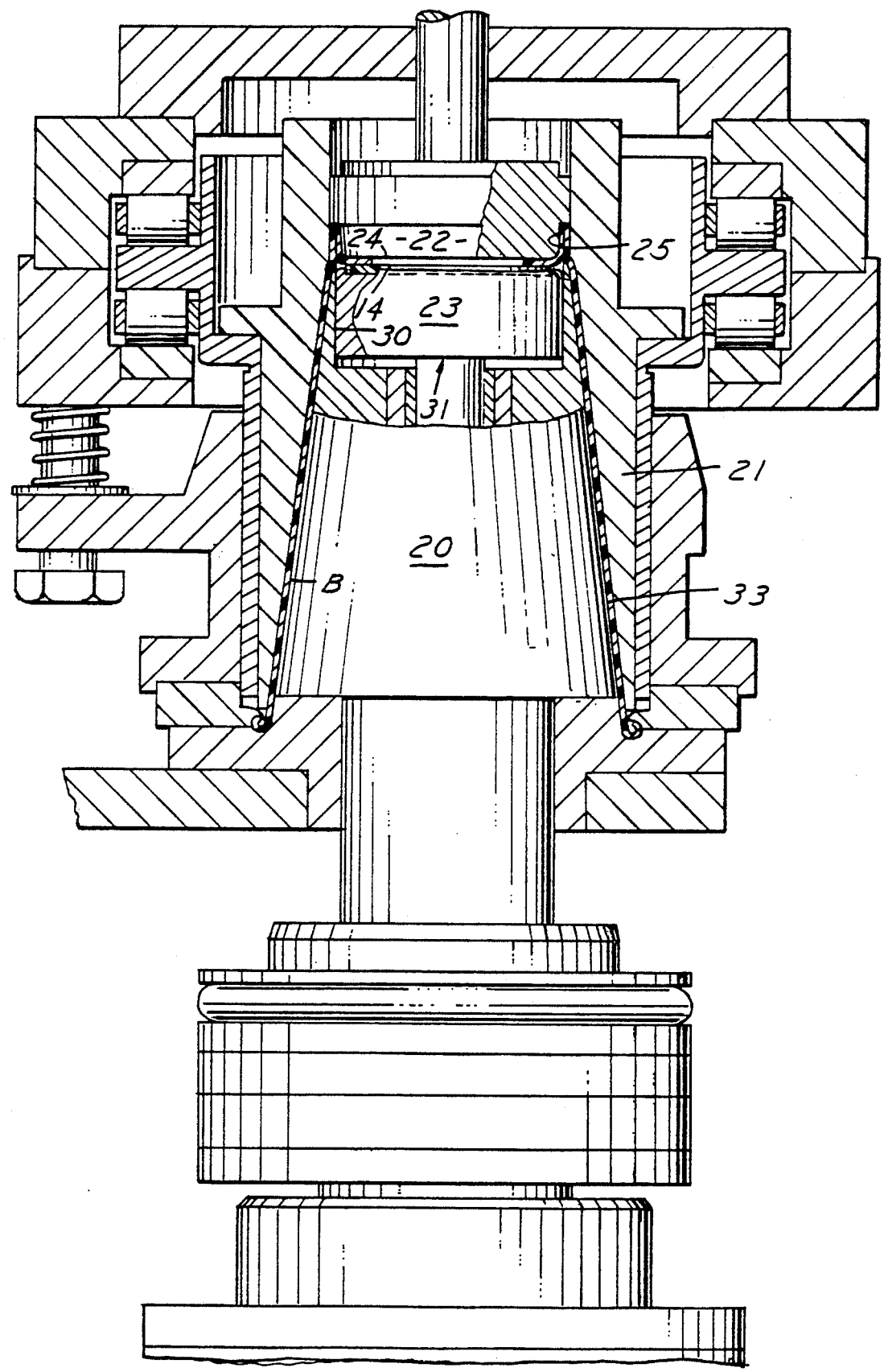

Such a method and apparatus is modified in accordance with the present invention and shown in FIGS. 3–11. Each container forming assembly includes a shrinking mandrel 20, annular sleeve member 21 and heated upper and lower forming and pressing members 22, 23. The above components are mounted in the manner as shown in the above entitled patent applications. The foam sleeve S has been previously formed on a cylindrical mandrel from a flat rectangular sheet and the ends are bonded to one another in overlapping relation by heat. The sleeve is placed on the shrinking mandrel 20 (FIG. 3) and the heat of the mandrel 20 and an overlying member causes the sleeve to shrink bringing the side wall into contact with the shrinking mandrel 20 and the upper edge of the side wall of the sleeve into overlying relation to the lower pressing member 23 (FIG. 4). In a succeeding position, the annular sleeve member 21 is moved axially downwardly into engagement with the shrunken foam sleeve while at the same time the upper pressing member 22 is moved toward the lower pressing member 23 (FIG. 5). Subsequent further movement of the upper member 22 forces the lower pressing member 23 downwardly causing the retraction of the lower member 23 so that the upper portion of the side wall of the sleeve is folded against itself to define the inner wall 12 and outer wall 10 of the container. Further movement of the members 22, 23 toward one another causes the generally radially lip 13 to be forced against the bottom disk 14 and be heat sealed thereto to form the bottom of the container.

The upper forming pressing member 22 includes a flat bottom surface 24 and an annular axial surface 25 that is generally cylindrical but tapers slightly inwardly and downwardly. The lower forming and pressing member 23 is generally cylindrical and has a flat upper surface 26 with a cylindrical recess 27 for receiving the bottom disk 14. The exterior surface 28 of the lower pressing member 23 is cylindrical and is engaged by the inner surface 30 of a recess 31 in the mandrel 20 into which pressing member 23 is movable axially. Annular sleeve 21 has an inner frustoconical surface 32 which is parallel to an exterior frustoconical surface 33 of mandrel 20. Sleeve 21 further includes an axially extending inner cylindrical surface 34.

Figure 11:
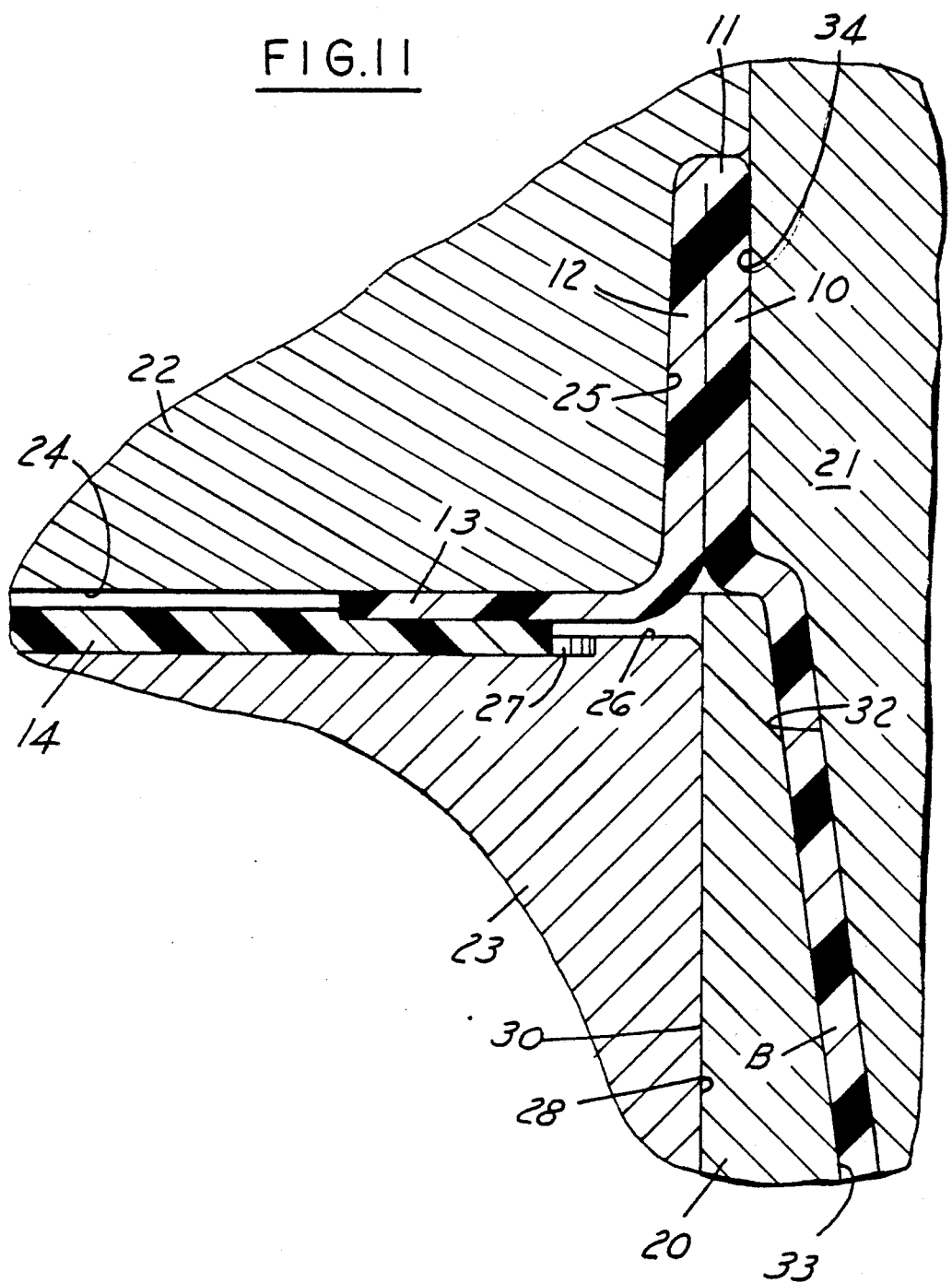

The diameter of surface 24 on sleeve member 21 is greater than the diameter of the lower forming and pressing member 23. The diameter of the surface 20 of the lower member 23 is greater than the maximum diameter of the upper pressing member 22. The space between the outer surface 25 of the upper member 22 and the sleeve member 21, when they are in adjacent position is preferably less than twice the thickness of the original cylindrical sleeves or shrunken sleeve such that the outer wall 10 and inner wall 12 are compressed radially into tight engagement. As shown in FIG. 11, the outer diameter of surface 28 of the lower member 23 lies along the contacting surfaces of walls 10, 12. The upper and lower pressing members 22, 23 are heated by heaters or hot air to maintain the portions of the sleeve S at a temperature such that the portions can be folded and pressed together to seal the disk 14 to the lip 13. Preferably, the temperature should be above the glass transition temperature of the foam material.

Figure 7:
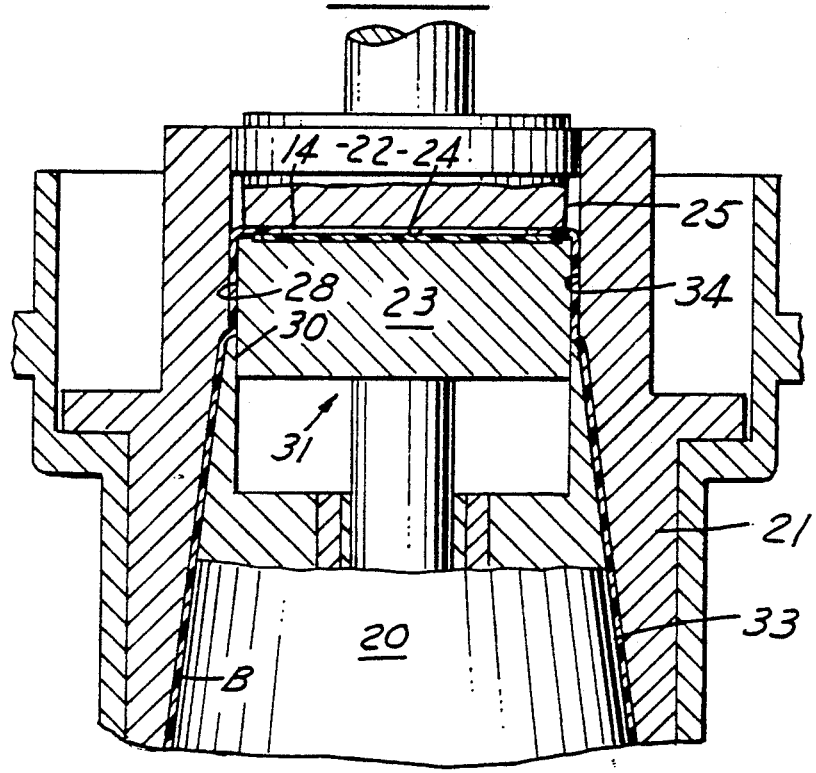
Figure 8:
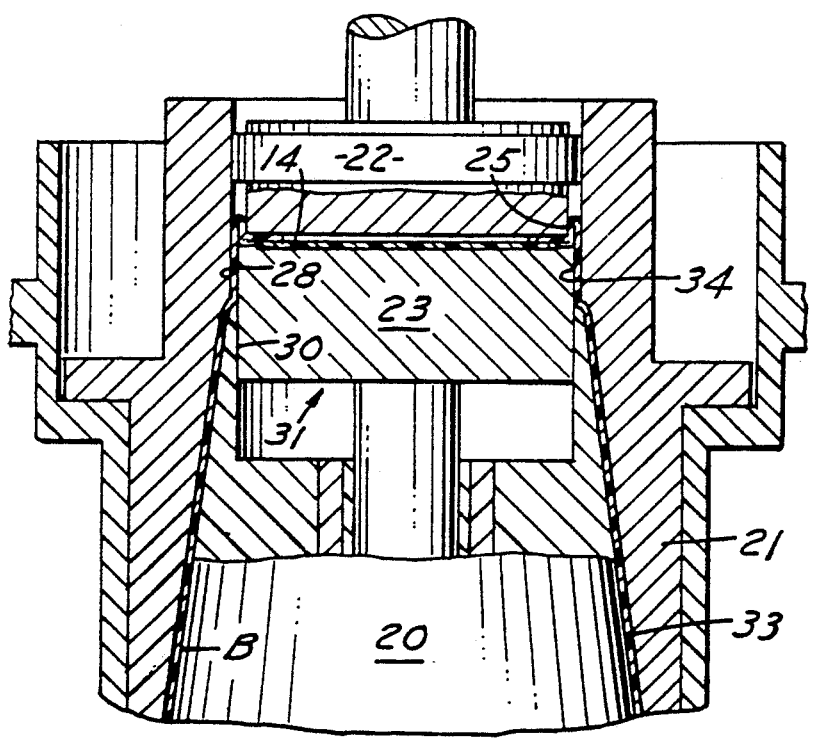
Figure 9:
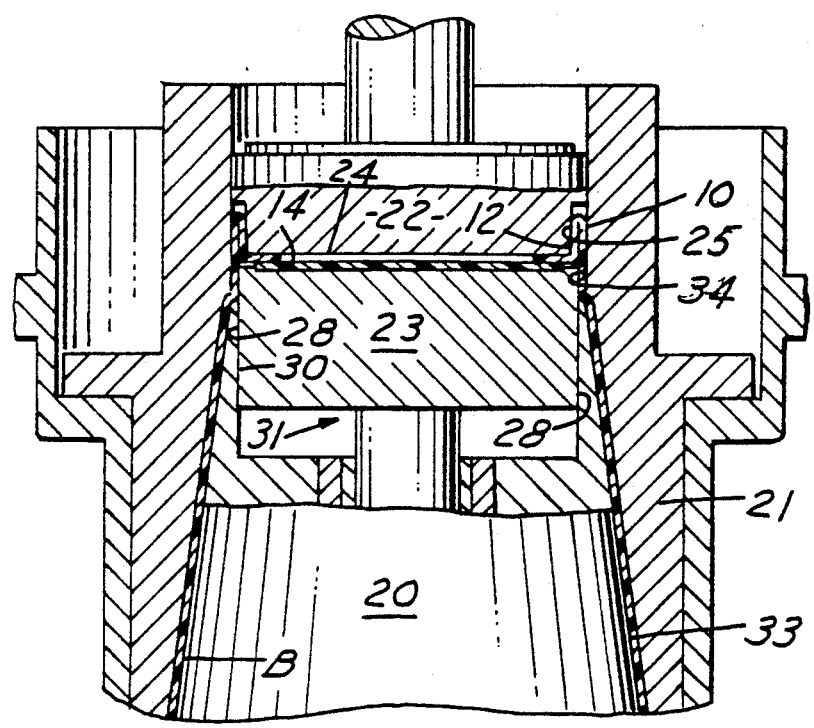
Figure 10:
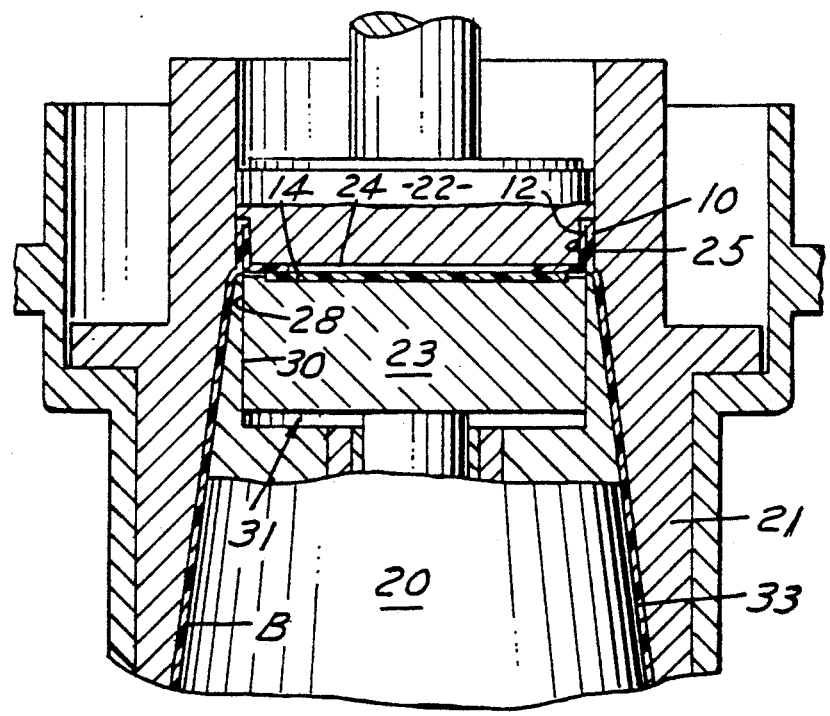

In one method of forming the cup-like container as shown in FIGS. 7–11, the lower pressing member 23 is in its uppermost position and the upper pressing member 22 is moved downwardly causing the annular lip 13 to be moved into contact, but not sealing relationship, with the disk 14 (FIG. 7). The upper pressing member 22 and lower pressing member 23 are then moved downwardly in unison to begin the folding of the outer and inner walls (FIG. 8). Further downward movement progressively folds the side wall into the desired configuration (FIG. 9). Further downward movement of the upper pressing member 22 and lower pressing member 23 moves the parts to the position shown in FIG. 10 where the final movement of the upper pressing member 22 downwardly seals the lip 13 to the disk 14.

Figure 12:
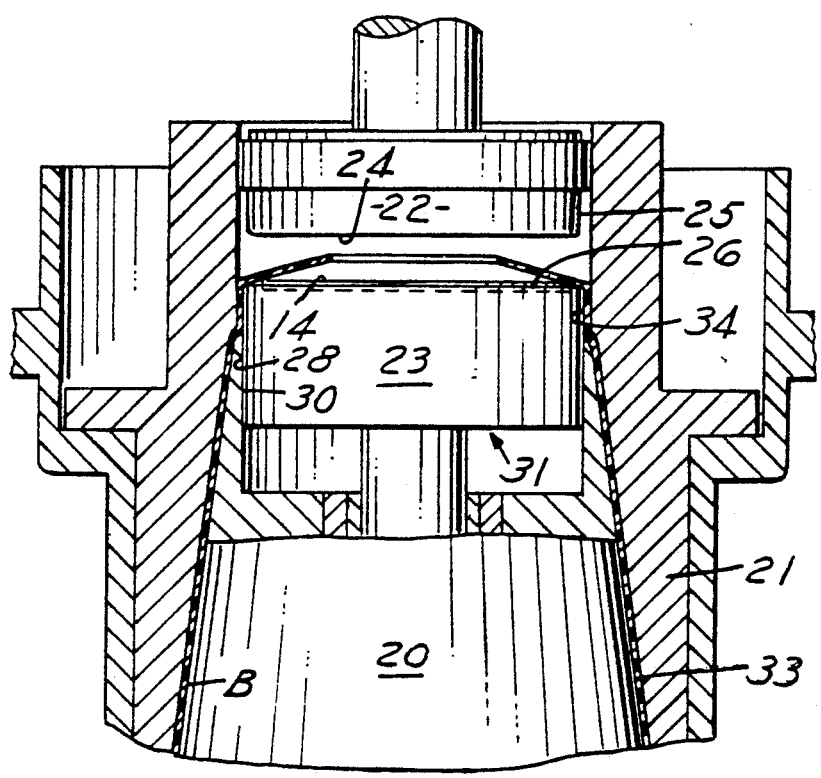
FIGS. 12–15 are fragmentary sectional views of the apparatus for forming a portion of the containers showing the parts in relatively different positions during a modified method of forming.
Figure 13:
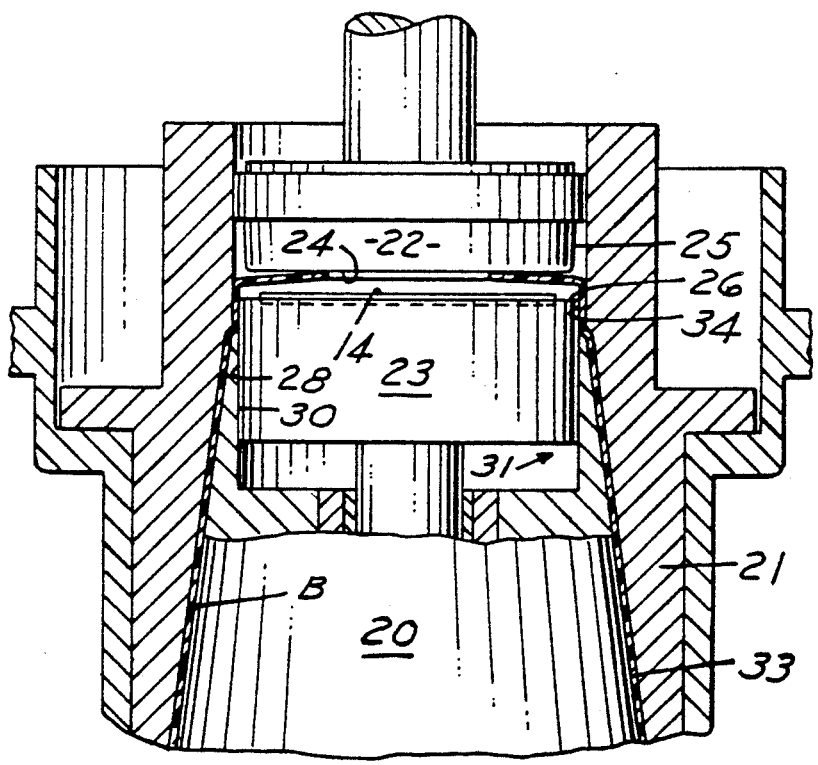
Figure 14:
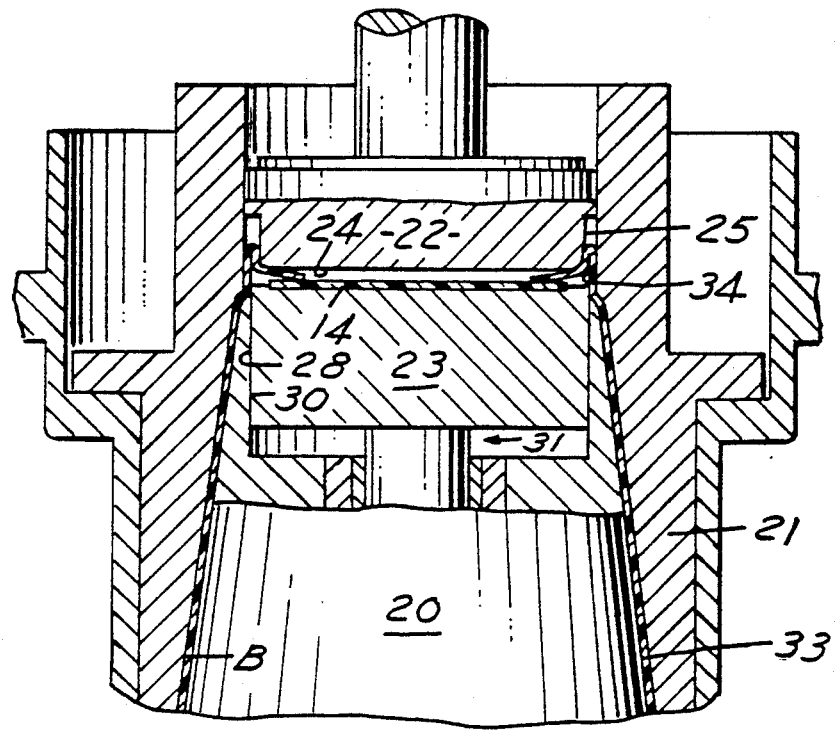
Figure 15:
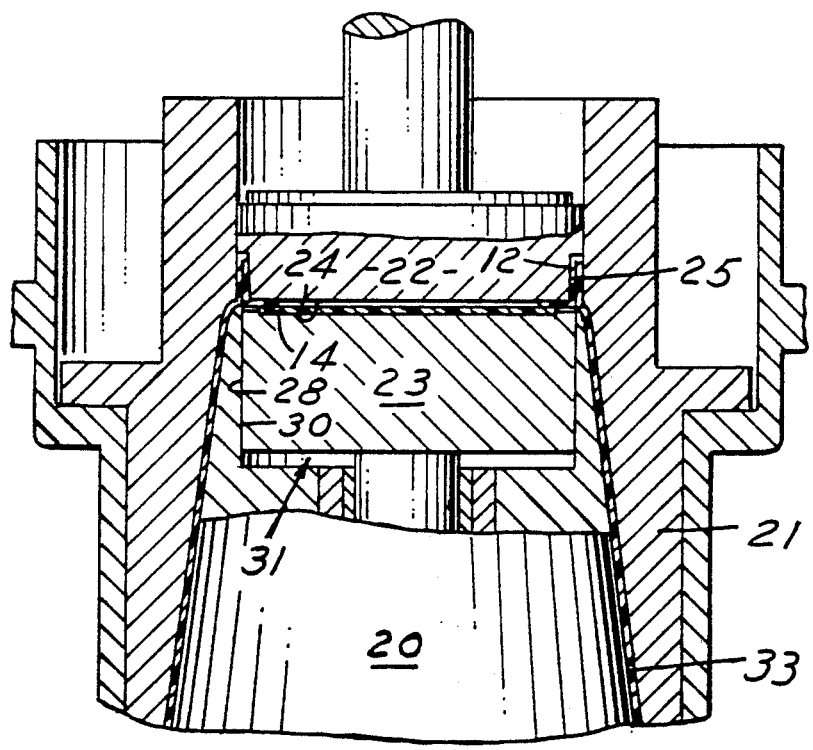

In the modified method as shown in FIGS. 12–14, the upper pressing member 22 is moved downwardly at the same time that the lower pressing member 23 is moved downwardly (FIGS. 12, 13). The downward movement of the upper pressing member 22 and lower pressing member 23 in unison is continued with the members in axially spaced relationship so that the initial folding of the walls is achieved by the upper pressing member 22 (FIG. 14) until the upper pressing member 22 engages the lip 13 with the disk 14 and then the upper pressing member 22 and lower pressing member 23 are moved downwardly together to complete the forming of the inner and outer walls of the base of the cup.

After removal from the forming members, the resultant cap has the outer wall 10 and the inner wall 12 in contact.

It can be seen that in both methods, the initially shrunk lip portion (FIGS. 4, 5, 7 and 12) has a greater radial dimension than the final lip 13 in the container due to the formation of the inner wall 12 and connecting portion 12.

When the apparatus such as shown in U.S. Pat. No. 3,845,583 is utilized, substantially the same apparatus would be used except that a vacuum would be applied to retain the bottom member since in such apparatus the container is in upright position as it is formed.

It can thus be seen that there has been provided a two-piece nestable cup-like container comprises a continuous side wall having an open upper end and includes a recessed bottom. The side wall is formed from a single double ended sheet of a heat-shrinkable thermoplastic material. The ends of the sheet are joined to one another along a liquid-tight seam. The side wall extends downwardly from a point near the open mouth of the upper end of the container to a point near the bottom and is thereafter folded at its lower edge upwardly to form a double wall portion and a radially unwardly extending annular portion that underlies a separate bottom member that is sealingly joined to the radially inwardly extending portion of the bottom edge of the side wall. In accordance with the method and apparatus, a sleeve made from the sheet by joining the ends is heat shrunk on a mandrel and the free edge at the lower portion of the side wall is caused to shrink inwardly. Opposed shaping members are moved toward one another while the sheet is at an appropriate temperature for shrinking and forming to define the doubled wall edge and to heat seal the bottom member to the radially inwardly extending portion.

It can thus be seen that there has been provided a two-piece nestable container which is formed from a double ended sheet that is first heat sealed to provide a sleeve like member and which container has a recess bottom; which container can be readily formed on known apparatus wherein the sheet is first heat sealed to form a sleeve and the sleeve is shrunk on a mandrel with minor modifications; wherein the method and apparatus does nod adversely affect the normal forming method of containers without a recessed bottom; and wherein the construction of the recessed bottom provides stability to the container; wherein the container can be readily stacked; wherein the container has a sufficiently large recess to receive condiments such as coffee or tea and be nested for use in dispensing machines; and wherein the depth of the recess can relatively easily be changed.

We claim:

1. A cup-like container comprising
a side wall formed from a single double ended sheet of a heat-shrinkable thermoplastic material,
the ends of said sheet being joined to one another to form a seam,
said side wall extending inwardly and downwardly from a point near the open mouth of the upper end of the container to a point near the bottom, and
a recessed bottom on the bottom of said side wall comprising an integral folded portion folded along its lower edge toward the mouth of the container to form a double wall portion having an inner wall and an outer wall, and a radially inwardly extending annular portion,
a separate bottom member overlying said radially inwardly extending portion and being sealing joined to said radially inwardly extending portion,
said outer wall and said inner wall being in abutting relation.

2. A cup-like container comprising
a side wall formed from a single double ended sheet of a heat-shrinkable thermoplastic material,
the ends of said sheet being joined to one another to form a seam,
said side wall extending inwardly and downwardly from a point near the open mouth of the upper end of the container to a point near the bottom, and
a recessed bottom on the bottom of said side wall comprising an integral folded portion folded along its lower edge toward the mouth of the container to form a double wall portion having an inner wall and an outer wall, and a radially inwardly extending annular portion,
a separate bottom member overlying said radially inwardly extending portion and being sealing joined to said radially inwardly extending portion,
said outer wall and inner wall being parallel and in abutting relation.

3. A cup-like container comprising
a side wall formed from a single double ended sheet of a heat-shrinkable thermoplastic material,
the ends of said sheet being joined to one another to form a seam,
said side wall extending inwardly and downwardly from a point near the open mouth of the upper end of the container to a point near the bottom, and
a recessed bottom on the bottom of said side wall comprising an integral folded portion folded along its lower edge toward the mouth of the container to form a double wall portion having an inner wall and an outer wall, and a radially inwardly extending annular portion,
a separate bottom member overlying said radially inwardly extending portion and being sealing joined to said radially inwardly extending portion,
said outer wall and said inner wall being in compressed abutting relation.

4. The container set forth in claim 3 wherein said bottom member is heat sealed to said radially inwardly extending portion and said outer wall and said inner wall are heat sealed to one another.

5. A cup-like container comprising
a side wall formed from a single double ended sheet of a heat-shrinkable thermoplastic material,
the ends of said sheet being joined to one another to form a seam,
said side wall extending inwardly and downwardly from a point near the open mouth of the upper end of the container to a point near the bottom, and
a recessed bottom on the bottom of said side wall comprising an integral folded portion folded along its lower edge toward the mouth of the container to form a double wall portion having an inner wall and an outer wall, and a radially inwardly extending annular portion, a separate bottom member overlying said radially inwardly extending portion and being sealing joined to said radially inwardly extending portion, said outer wall and said inner wall being in compressed abutting relation, the cross sectional thickness of said abutting walls being slightly less than double the thickness of said side wall.

6. A cup-like container comprising a side wall formed from a single double ended sheet of a heat-shrinkable thermoplastic foam material, the ends of said sheet being joined to one another to form a seam, said side wall extending inwardly and downwardly from a point near the open mouth of the upper end of the container to a point near the bottom, and a recessed bottom on the bottom of said side wall comprising an integral folded portion folded along its lower edge toward the mouth of the container to form a double wall portion having an inner wall and an outer wall, and a radially inwardly extending annular portion, a separate bottom member overlying said radially inwardly extending portion, said bottom member comprising a disk made of thermoplastic foam material, said disk having a diameter less than the outer diameter of said radially inwardly extending portion, and being sealing joined without adhesives to said radially inwardly extending portion.

7. The combination set forth in any one of claims 1–5 wherein said container is made of a formed plastic material.

* * * * *